(12) United States Patent
Vemprala et al.

(10) Patent No.: US 11,789,466 B2
(45) Date of Patent: *Oct. 17, 2023

(54) EVENT CAMERA BASED NAVIGATION CONTROL

(71) Applicant: Microsoft Technology Licensing, LLC, Redmond, WA (US)

(72) Inventors: Sai Hemachandra Vemprala, Bellevue, WA (US); Sami Tariq Mian, Pittsburgh, PA (US); Ashish Kapoor, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/126,782

(22) Filed: Dec. 18, 2020

(65) Prior Publication Data

US 2022/0197312 A1 Jun. 23, 2022

(51) Int. Cl.
| | |
|---|---|
| *G05D 1/10* | (2006.01) |
| *G06V 10/40* | (2022.01) |
| *G06V 20/56* | (2022.01) |
| *G06N 3/08* | (2023.01) |
| *G08G 5/00* | (2006.01) |
| *G08G 5/04* | (2006.01) |
| *H04N 7/18* | (2006.01) |

(52) U.S. Cl.
CPC .............. *G05D 1/106* (2019.05); *G06N 3/08* (2013.01); *G06V 10/40* (2022.01); *G06V 20/56* (2022.01); *G08G 5/0021* (2013.01); *G08G 5/0069* (2013.01); *G08G 5/045* (2013.01); *H04N 7/183* (2013.01)

(58) Field of Classification Search
CPC ............................ G05D 1/106; G05D 1/105
See application file for complete search history.

(56) References Cited

U.S. PATENT DOCUMENTS 11,106,893 B1 * 8/2021 Zhu ........................... G06T 7/74
11,199,853 B1 * 12/2021 Afrouzi ............... G05D 1/0246
(Continued)

FOREIGN PATENT DOCUMENTS

| JP | 2009522654 A | * | 12/2005 |
| KR | 20200007031 A | * | 1/2020 |

OTHER PUBLICATIONS

Machine Translation of Korean Patent Application Pub. No. KR20200007031A filed in 2017. (Year: 2017).*

(Continued)

*Primary Examiner* — Jean Paul Cass
(74) *Attorney, Agent, or Firm* — Schwegman Lundberg & Woessner, P.A.

(57) ABSTRACT

A computer implemented method for controlling a system moving through an environment includes receiving a stream of event data from an event camera, the stream of event data representing a pixel location, a time stamp, and a polarity for each event detected by the event camera. A compressed representation of the stream of data is generated. The compressed representation is provided to a neural network model trained on prior compressed representations using reinforcement learning to learn actions for controlling the system. A control action is generated via the neural network model to control the movement of the system.

20 Claims, 7 Drawing Sheets

(56) References Cited

U.S. PATENT DOCUMENTS

| | | | | |
|---|---|---|---|---|
| 2018/0204111 | A1* | 7/2018 | Zadeh | G06V 10/764 |
| 2019/0258878 | A1* | 8/2019 | Koivisto | G01S 7/417 |
| 2020/0139973 | A1* | 5/2020 | Palanisamy | G06N 5/046 |
| 2020/0184278 | A1* | 6/2020 | Zadeh | G06N 3/044 |
| 2020/0265590 | A1* | 8/2020 | Daniilidis | G06T 7/269 |
| 2021/0086370 | A1* | 3/2021 | Zhang | B25J 9/0084 |
| 2021/0209388 | A1* | 7/2021 | Ciftci | G06V 40/40 |
| 2021/0212606 | A1* | 7/2021 | Tran | A61B 5/01 |
| 2021/0383139 | A1* | 12/2021 | Jia | G06V 20/58 |
| 2022/0121884 | A1* | 4/2022 | Zadeh | G06V 10/764 |
| 2022/0197312 | A1* | 6/2022 | Vemprala | G06V 10/40 |
| 2022/0265178 | A1* | 8/2022 | Tran | A61B 5/0075 |

OTHER PUBLICATIONS

Machine Translation of Chinese Patent Application Pub. No. CN111695681B (Year: 2020).*

Chen, G., et al., "Event-Based Neuromorphic Vision for Autonomous Driving: a Paradigm Shift for Bio-Inspired Visual Sensing and Perception", in Journal of IEEE Signal Processing Magazine, vol. 37, Issue 4, Jun. 30, 2020, pp. 34-49.

"International Search Report and Written Opinion Issued in PCT Application No. PCT/US21/060429", dated Feb. 25, 2022, 10 Pages.

"Event-based, 6-DOF Pose Tracking for High-Speed Maneuvers using a Dynamic Vision Sensor", Retrieved from: https://www.youtube.com/watch?v=LauQ6LWTkxM&feature=youtu.be&t=30, Sep. 15, 2014, 3 Pages.

"Prophesee", Retrieved from: https://www.prophesee.ai/, Retrieved Date: Sep. 14, 2020, 15 Pages.

Jordan, Jeremy, "Introduction to autoencoders.", Retrieved from: https://www.jeremyjordan.me/autoencoders/, Mar. 19, 2018, 16 Pages.

Lichtsteiner, et al., "A 128×128 120dB 15us Latency Asynchronous Temporal Contrast Vision Sensor", in IEEE Journal of Solid State Circuits, vol. 43, Issue 2, Feb. 2008, pp. 566-576.

Qi, et al., "PointNet: Deep Learning on Point Sets for 3D Classification and Segmentation", in Journal of the Computing Research Repository, Dec. 2016, pp. 77-85.

Rifai, et al., "Contractive auto-encoders: Explicit invariance during feature extraction", in Proceedings of the 28th International Conference on Machine Learning, Jun. 2011, 8 Pages.

Sekikawa, et al., "EventNet: Asynchronous recursive event processing", in Repository of arXiv: 1812.07045v1, Dec. 7, 2018, 9 Pages.

Vaswani, et al., "Attention Is All You Need", in Proceedings of the 31st Conference on Neural Information Processing Systems, Jun. 1, 2017, 11 Pages.

Watter, et al., "Embed to Control: A Locally Linear Latent Dynamics Model for Control from Raw Images", in Repository of arXiv: 1506.07365v3, Nov. 20, 2015, pp. 1-18.

* cited by examiner

EVENT CAMERA BASED NAVIGATION CONTROL

BACKGROUND

Avoiding collisions by unmanned vehicles is an important function. Prior collision avoidance functions utilized conventional cameras, which capture the visible scene as a still image, and various trained machine learning models to avoid obstacles in the way of the unmanned vehicle while the vehicle is proceeding to a known destination.

Autonomous navigation is an area that has received significant interest over the years but remains a challenging task. As intelligent navigation is driven by a tight coupling between perception and action, it is particularly challenging for fast, agile robots such as unmanned micro aerial vehicles (MAV) that are often deployed in cluttered and low altitude areas.

Reactive navigation applications such as for obstacle avoidance, benefit from low sensor latency to perform agile maneuvers successfully. MAVs are also limited in their size and payload capacity, which constrains onboard sensor choices to small, low-power sensors. The computational load of the processing algorithms should be minimal.

Modern computer vision and machine learning techniques for perception and navigation typically focus on analyzing data from conventional CMOS based cameras, in various modalities such as RGB images, depth maps etc. While these cameras provide high resolution data, the main drawback of these sensors is their speed, with most averaging output at a rate of 30-60 Hz. This makes such sensors unable to scale up to a sufficient perception data rate for agile navigation.

SUMMARY

A computer implemented method for controlling a system moving through an environment includes receiving a stream of event data from an event camera, the stream of event data representing a pixel location, a time stamp, and a polarity for each event detected by the event camera. A compressed representation of the stream of data is generated. The compressed representation is provided to a neural network model trained on prior compressed representations using reinforcement learning to learn actions for controlling the system. A control action is generated via the neural network model to control the movement of the system.

DETAILED DESCRIPTION

Figure 1:
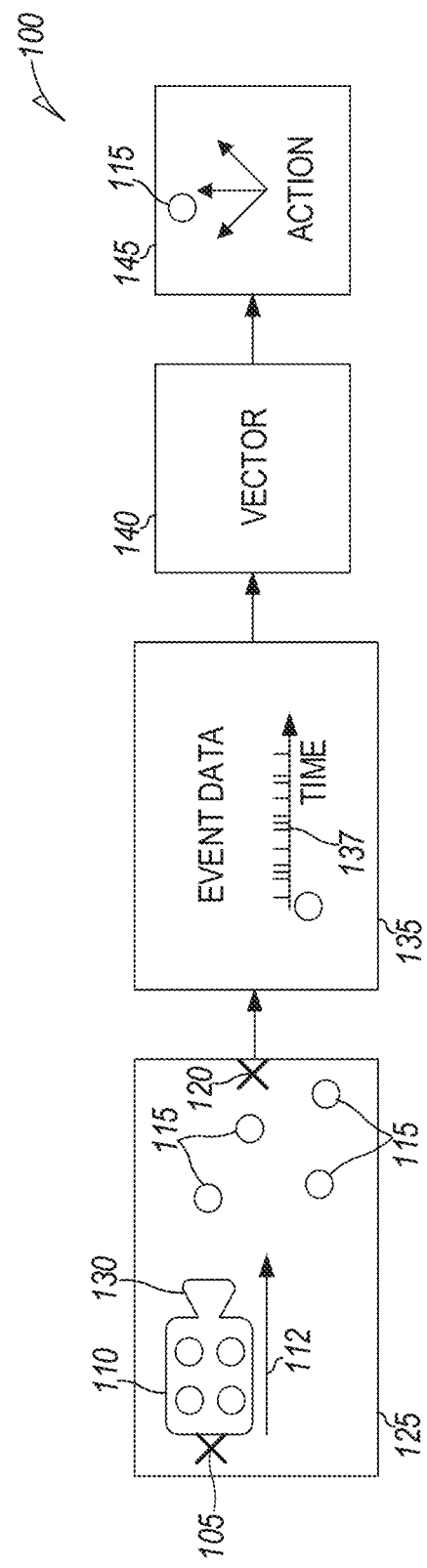
FIG. 1 is a block flow representation illustrating a system 100 and method for controlling a vehicle according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Event cameras, or neuromorphic cameras are novel vision sensors that respond to local changes in brightness. In contrast with conventional cameras, which capture the visible scene as a still image through a shutter mechanism, event cameras contain independent per-pixel sensors that fire asynchronously when they detect changes in brightness at that pixel. This low-level representation allows event cameras to operate extremely fast—often at a microsecond resolution. Event cameras also provide several other advantages over conventional cameras such as a high dynamic range, less motion blur and exposure issues. Event cameras provide data as a stream of bytes, containing the pixel location, a time stamp and a polarity indicating whether the brightness has increased or decreased at that pixel.

For fast-moving autonomous robots such as unmanned aerial vehicles (UAV), it is helpful to have sensors that can provide data at a rate matching the speed of movement as well as control capacity. Motors used to power and control navigation of conventional UAV platforms are often controlled at frequencies of 400-500 Hz, well above the frame rate of most conventional cameras. Hence, for fast, agile, and safe movement, event cameras provide an effective sensing mechanism.

FIG. 1 is a block flow representation illustrating a system 100 and method for controlling a vehicle 110 moving, as indicated by arrow 112 from a start position 105, through obstacles 115 to reach a desired goal or destination 120. Vehicle 110 includes a forward-facing event camera 130 that generates events. An environment 125 may be a real environment through which the vehicle 110, such a quad copter flies, or may be a simulation of the environment 125 that simulates both the obstacles 115, the vehicle 110, as well as even camera 130.

A stream of event data 135 is received from the event camera 130. The stream is represented in event data 135 as vertical lines on a time axis at 137. In a simulated environment, the event data may also be simulated. Data for each event represents a pixel location, a time stamp, and a polarity as each event is detected and streamed by the event camera 130. The stream of data is provided to one or more feature generators to generate a compressed representation of the stream of data referred to as vector 140. The compressed representation is provided to a neural network model 145 trained on prior compressed representations using reinforcement learning to learn actions for the system 100, such as a model executing on processing resources on vehicle 110. Vehicle control actions based on model 145 output may include proceeding straight, moving to the right, or moving to the left. In further embodiments, additional control actions, such as moving up and down, as well as varying speed, may be included in the same model or additional models.

A simulation of the vehicle 110 in the context of the path from start 105 to destination 120 may be used in the training. Obstacles 115 in the path to the destination 120 are to be avoided, with rewards provided for avoiding the obstacles.

Vehicle 110 may include suitable processing resources to perform a method that uses the event-camera 110 event data 135 for representation learning to create vector 140 and for perception-action loops to generate actions 145 for controlling the vehicles 140. A reinforcement learning (RL) algorithm learns actions for control of the vehicle based on the event camera data. Such learning is likely to occur offline via server or cloud based computing resources.

While machine learning techniques are used widely with vision sensors such as cameras, the radically different output of an event camera means that techniques such as convolutional neural networks (CNN) are not directly applicable.

In order to perform reinforcement learning using fast-changing, asynchronous, event camera data, a representation learning neural network first processes the asynchronous bytestream from the event camera 110 and converts or encodes the bytestream into the compressed representation, vector 140, also referred to as an encoding or latent vector 140. The compressed representation can be used for training the representation learning via normal backpropagation-based training techniques for vehicle control as well as input for controlling the vehicle.

In various embodiments, one or more feature generators may be applied to asynchronous event camera data to create the compressed representation. This allows representation learning to be entirely unsupervised and does not require any crafting of ground truth labels. The resulting neural network is also constructed such that it is invariant to the order of data, thus making it applicable to asynchronous data.

The representation learning and reinforcement learning neural networks may be trained using simulated event camera data from a robotics simulator such as Microsoft AirSim. A task of obstacle avoidance for a UAV may be used as a test task to validate how the representation learning and reinforcement learning work. Event camera data is used to learn the compressed representations and subsequently for learning actions through reinforcement learning. Reinforcement learning training benefits from the speed of event camera data and is able to learn actions more quickly compared to data from a conventional camera.

Event-based cameras detect and measure changes in log-luminance on a per-pixel basis and return information about 'events' with a temporal resolution on the order of microseconds. Due to the increased sampling speed of event cameras and the minimal processing needed to parse the data, perception using event cameras can be much faster than traditional approaches. This can allow for faster control schemes to be used, as enough relevant environmental information can be collected quickly in order to make informed control choices. Moreover, the events are inherently generated by changes in brightness typically arising from motion. This makes event cameras natural motion detectors and a good fit for learning control policies.

But the fundamentally different visual representation of event cameras poses significant challenges to quick adoption. Event cameras produce fast and asynchronous spatiotemporal data, significantly different from synchronous frame-based data expected by conventional machine learning algorithms. In addition, the quality of the data recorded by an event camera is different from traditional camera image-based perception sensors. The event camera sensors return low-level data having a rate that could vary significantly based on the firing order of pixels, lighting conditions, reflections or shadows.

Previous research has approached this modality through two main classes of techniques. Some approaches accumulate event data over time into a two-dimensional frame and use traditional computer vision/convolutional neural network-based techniques with such frame-based inputs. Traditional CNN approaches combined with such accumulation fail to exploit the true advantages of event cameras such as the microsecond-scale temporal resolution and may prove to be too compute intensive for high-speed action generation via onboard resource constrained platforms.

Another class of techniques involves the usage of spiking neural networks (SNN). SNNs operate through spiking neurons to identify spatiotemporal firings, making it a natural match for event cameras. Yet, training spiking neural networks is hard, as SNNs do not use standard backpropagation, and often require specialized hardware to truly realize their efficiency.

Embodiments of the present inventive subject matter provide a way to interpret asynchronous event camera bytestream data, and to learn visuomotor (vision-based motor control) policies from the interpretation using standard machine learning methods. Thus, separate networks are provided for learning the compressed representation and for controlling the UAV with the compressed representation as input.

Figure 2A:
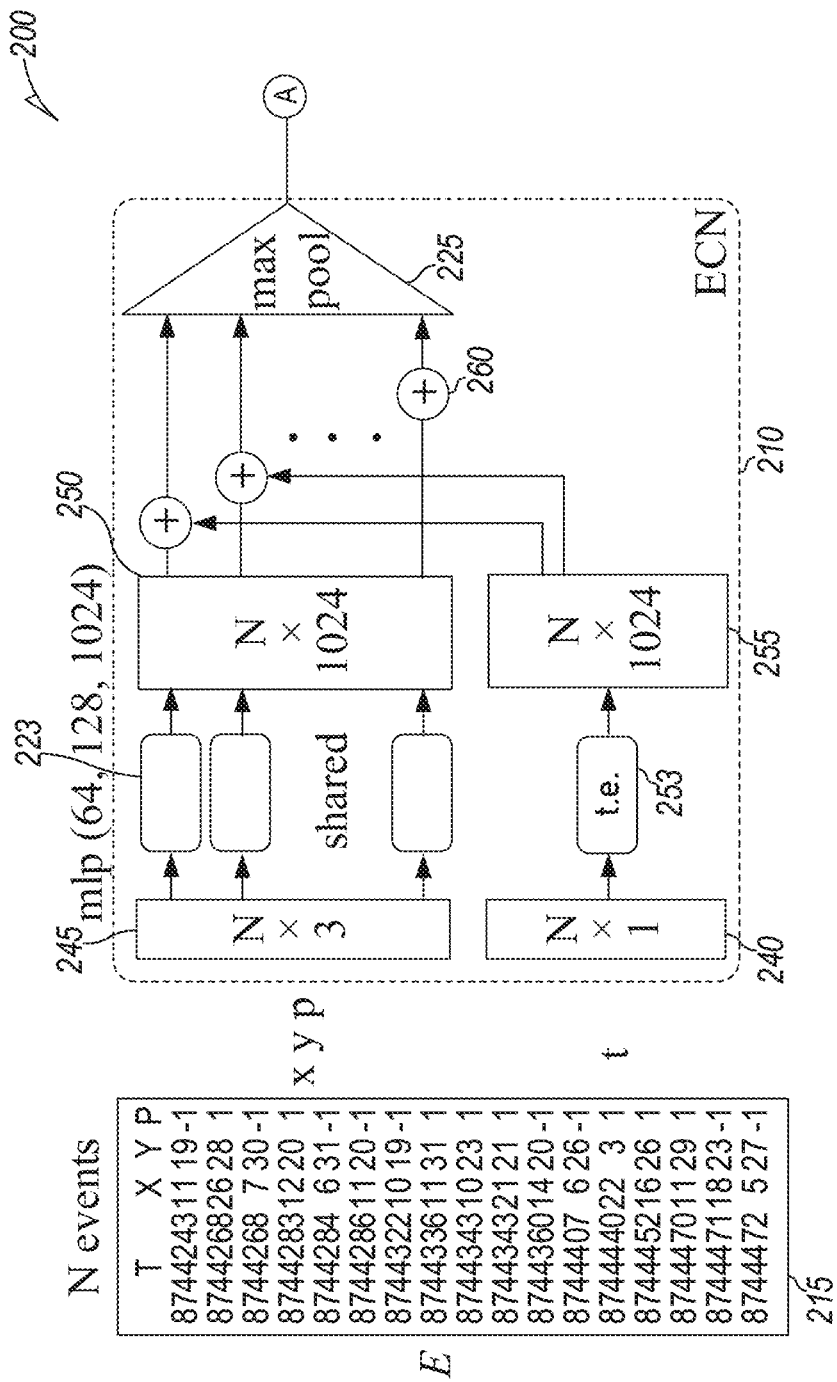
FIGS. 2A and 2B are a block flow diagram illustrating an event variational autoencoder for creating a compressed representation of event data according to an example embodiment.
Figure 2B:
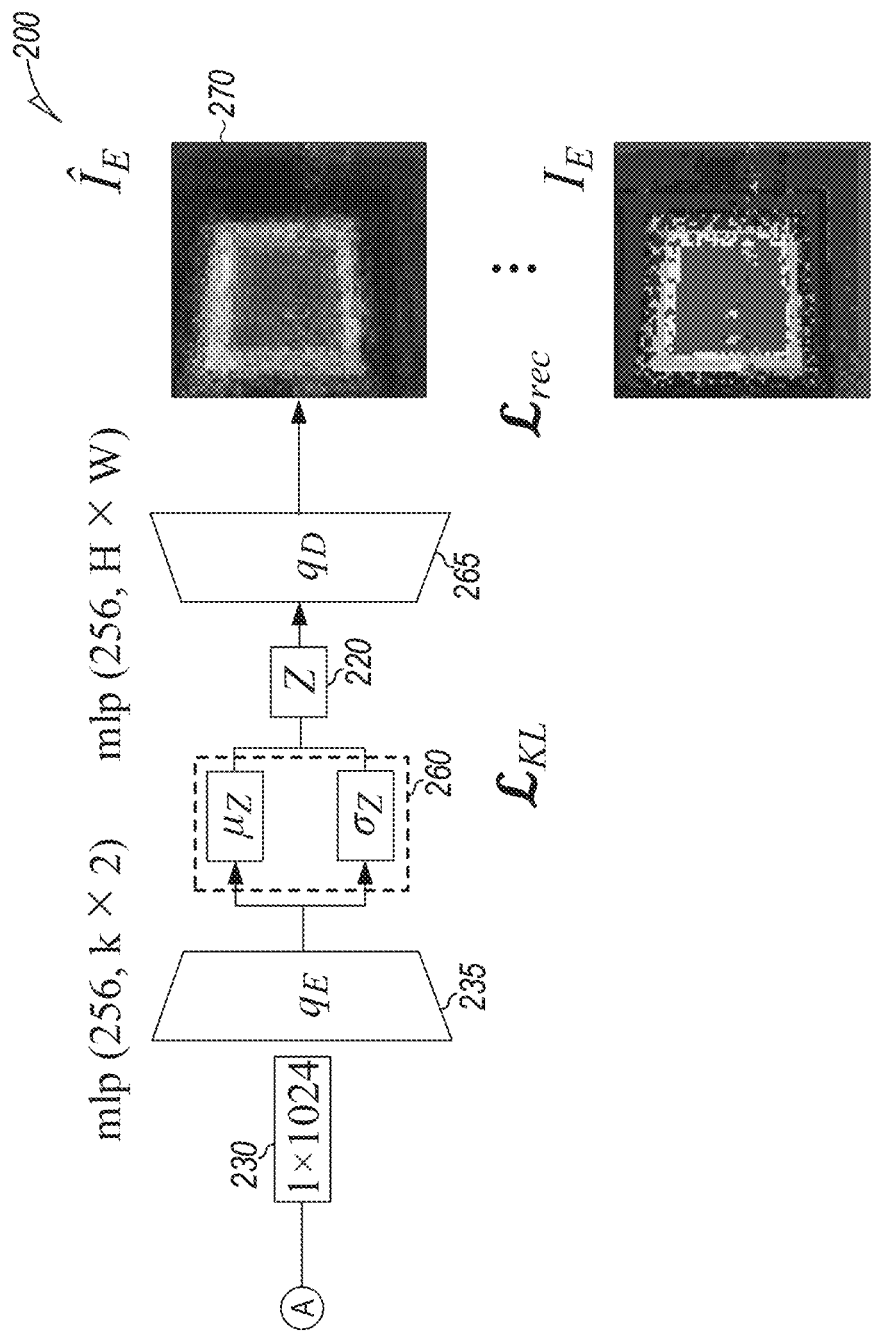

FIGS. 2A and 2B are a block flow diagram illustrating an event variational autoencoder (eVAE) indicated generally at 200. Compressed representations are learned from event data in a way that allows for high temporal resolution as well as invariance to data permutations and sparsity. The eVAE 200 is equipped with an event context network (ECN) 210 to compute features by processing asynchronous event camera data 215 from arbitrary sequence lengths, or in a recursive fashion. Data 215 comprises event camera data for N events that includes a timestamp (t), pixel coordinates (x,y) and a polarity (p). The polarity has been normalized to have values of −1 or +1 based on comparison of intensity value change over time to a threshold value. Example detected pixel intensity value thresholds may be about 0.1-0.5 units of change in logarithmic intensity.

The eVAE 200 uses a temporal embedding method that preserves the event timing information when computing compressed representations, referred to as a latent vector 220. Latent vector 220 can be beneficial for reactive navigation, by applying them as observations in a reinforcement learning framework. The latent vector 220 is an encoded representation of locations of obstacles and motion information derived from the event camera data 215. Salient information, even from sparse data, allows reconstruction obstacles, such as a gate or cone correctly from data of different lengths. The latent vector 220 that is trained in one environment can generalize to other environments by retaining contextual information like object location.

In one embodiment, the latent vector 220 is a low dimensional latent vector, such as 8 floating point numbers. Any length of event data will eventually turn into a latent vector of 8 numbers, thus making subsequent reinforcement learning very efficient and suitable for resource constrained platforms. In further embodiments, the latent vector may have other lengths, such as from 4 to 16 or more numbers to accommodate platforms with less or greater computing resources.

Obstacle avoidance for UAVs is a task of interest for reactive navigation. Training visuomotor control policies for UAV navigations over an existing compressed representation allows the visuomotor control policy to generalize to different data rates associated with event cameras, exploiting the invariances of the representation, and can reduce model size and search space. The event camera data can be effectively utilized for avoidance of obstacles at high control rates. An event data simulator has been used to simulate scenarios where the UAV is assumed to be controlled at up to 400 Hz. The latent vector compressed representations enable handling of sparse data in a manner that allows a visuomotor policy to adapt to high control rates.

Feature learning from event data can be treated as a case of learning long, variable length sequences. In one embodiment, spatial and temporal parts are decoupled to enable permutation-invariant learning from sets. In one example, network 210 has an architecture similar to PointNet as described below, but modified to separate time from the spatial data. Network 210 takes n points from data 215 as input, applies input and feature transformations at network layers 223 referred to as a spatial feature generator, and then aggregates event features by max pooling at 225. The output 230 is a global feature that compresses all the data from the computed features. Network 210 concatenates global and local features and outputs per point scores using a multilayer perceptron (MLP). Numbers in brackets in FIG. 2 describe layer sizes.

The event-based camera 110 in one embodiment is a special vision sensor that measures changes in intensity levels independently at each of its pixels. Given a pixel location (x; y), the fundamental working principle of an event-based camera is to measure the change in logarithmic brightness at that pixel, i.e., $\Delta \log I((x,y), t)$ where I is the photometric intensity.

When this change in logarithmic brightness exceeds a set threshold such as 0.1-0.5 units of logarithmic intensity change, the camera generates an 'event', reporting the time and location of change, along with whether the change is an increase or decrease in intensity at that pixel location. In contrast to conventional cameras which output a set number of frames per second, an event camera outputs events sparsely and asynchronously in time as a stream of bytes, which we refer to as an event 'bytestream'. These events are produced at a non-uniform rate, and the number can range from zero to millions of events per second. For example, one known event camera has a theoretical maximum limit of 12 million events per second. A standard event camera has a resolution of 320×240 for example. Other resolutions may be used. For an event camera of resolution (H,W), an event is defined as a tuple of four quantities e=(t, x, y, p) where t is a global timestamp at which the event was reported by the camera, (x; y) the pixel coordinates, and p the polarity.

A sequence of events over a time window of T can thus be represented as $E_\tau = \{e_i | t < i < t+\tau\}$. When sliding a constant time window of $\tau$ over a longer sequence of events, the length of $E_\tau$ will not be constant as the number of events fired in that interval would change based on environmental or sensory considerations. The events in $E\tau$ can also be accumulated and represented as a corresponding event image frame $I_{E\tau}$.

Given event data 215 as an arbitrarily long bytestream $E\tau$, the objective of representation learning in network 210 is to map the bytestream to a compressed vector 230 representing the latent state of the environment $z_\tau$ 220 through an encoder function $q_e(E_\tau)$ at 235. The challenges here are two-fold. First, due to the non-uniform and asynchronous nature of the event camera data, the same object being imaged multiple times by an event camera could result in different permutations of the output. Hence, to handle the asynchronicity of event cameras, a feature computation technique is used that is invariant to data ordering.

Secondly, while event sequences are time-based data, recurrent neural networks would prove to be infeasible due to the often, long sequence lengths. Decoupling the temporal information 240 from the spatial/polarity information 245 alleviates this problem. To achieve this, network 210 is configured to learn unordered spatial data.

ECN 210 computes features for 3D point sets and extends the concept to event data by adapting it for recursive processing of events. ECN 210 is functionally similar to PointNet, wherein it takes an arbitrarily long list of events, and first computes a feature 250 for each event separated from the timestamp of the events. Eventually, these features 250 are passed through a symmetric maximum identification function, such as max pool 225, resulting in a global feature that is expected to condense information from all the events. Temporal embeddings are thus added to the features 250 and the max pool 225 operation results in a global context vector that is then projected into a latent space and may subsequently be decoded into an 'event image' to enable unsupervised representation learning.

The symmetric nature of this function, max pool 225, ensures that events in a given list can be processed either as a single batch, or recursively with any minibatch size to compute the output. The output of this feature identification network, ECN 210 is the context vector 230. The ECN 210 includes a spatial feature generator which consists of three dense layers 223 which, for N input events 245, output an N×D set of features 250. The data passed into these dense layers 223 is only the (x, y, p) part of the events.

Handling the temporal information, t, is now described. Timestamps, t, in the event data 215 inherently encode the continuous-time representation of the world that was perceived during a given time slice. The timestamps are retained to ensure the compressed representation 220 is sufficiently informative of the evolution of the world state. On the other hand, incorporating the timestamp is not equally straightforward.

Due to the asynchronicity of the event data 215, a particular event that has fired may have any arbitrary timestamp within the sequence. Hence, including the temporal data as an input to the ECN dense layers 223 handling the spatial data directly would interfere with the feature computation. The interference is due to the global timestamps being arbitrary values. In addition, the relative time difference of each event would change every time new events are received, necessitating a recomputation of the features.

Instead, temporal embeddings are utilized. For the event set $E_N$ with N events, the timestamps for a sequence or window of events are normalized at 240 to [0; 1] such that the timestamp corresponding to the end of the window maps to 1. The ECN 210 computes a D-dimensional temporal feature, te, at a temporal feature generator 253 for each normalized timestamp as follows:

$$te(t, 2i) = \sin\left(\frac{100t}{1000^{i/d}}\right),$$

$$te(t, 2i+1) = \cos\left(\frac{100t}{1000^{i/d}}\right)$$

where $i \in [0, d/2]$, $t \in [0, 1]$ d represents the number of dimensions used per feature. Each event is described using a 1024 dimensional feature, hence d would be 1024. Similarly, t is the relative timestamp of the event compared to the oldest event in a given window of time.

The resulting embeddings 255 are summed up with their corresponding features at 260 where $\mu_z$ is the mean, and $\sigma_z$ is the standard deviation. Together they describe a probability distribution that the latent space is trying to learn. The ECN 210 passes this N×D feature set through the symmetric function max 225 to obtain the 1×D final context vector 230. The ECN 210 contains three dense layers 223 for the feature computation along with the temporal embedding module 240, 253, 255 and the max pool operator 225.

When learning representations for control, it is desired for an efficient dimensionality reduction technique to create a smooth, continuous, and consistent representation. It is also desirable to have the encoded vectors' dimensions map to specific learned attributes of the perceived information, which can then be exploited by the control policies for interpretable learning. To achieve this, the feature computation is performed using variational autoencoders.

In one embodiment, encoder 200 is a variational autoencoder (VAE) 200 that provides a probabilistic framework for mapping or encoding observations into a latent space. A latent space is basically a compressed representation of the data that retains the information needed to accomplish the goal of machine learning. In this case, the latent space, referred to as a latent vector 220 contains sufficient information about object location and motion information to enable motor control policies in a model receiving the latent vector 220 to perform collision avoidance.

VAE 200 is configured to describe a probability distribution for each latent attribute, instead of mapping attributes to outputs randomly. The eVAE 200 learns a parametric latent variable model, MLP, by maximizing the marginal log-likelihood of the training data, composed of a reconstruction loss and a KL-divergence loss 260:

$$l(\theta) \geq \sum_{i=1}^{M} \mathbb{E}_{Q_i(z_i)}[\log p_\theta(x_i \mid z_i)] - D_{KL}(Q_i(z_i \mid x_i) \| p(z_i))$$

The two terms describe the reconstruction loss, and the KL divergence loss respectively. The objective of the eVAE 200 is to find an approximate probability distribution that encodes the data that it has seen during training.

The content in this equation is known as an 'evidence lower bound' (ELBO). If one assumes $x_i$ is the observed data, and $z_i$ is a latent vector, p(x|z) describes the joint probability distribution over x and z. The first term in the equation attempts to maximize the log likelihood of this, thus making sure the latent vectors are properly describing the input data (through the reconstructed event image and the unsupervised learning). The second term indicates the Kullback Liebler (KL) divergence—which forces the approximate posterior distribution in the latent space to take the form of a Gaussian, thus enforcing properties such as smoothness. By considering both these terms in the loss function, both an accurate and a smooth latent space is constructed.

The eVAE 200 operates on the context vector 230 computed by the ECN 210. eVAE 200 includes an encoder 235 that is composed of two dense layers, MLP (256, k×2) as seen in FIG. 2B. Instead of trying to reconstruct the entire input stream in a decoding phase, an event image decoder 265 is used and attempts to decode the latent vector back to an approximate event image 270 corresponding to the input sequence using MLP (k, H×W) layers. This event image is a single channel image frame that is the result of accumulating all the events according to their pixel locations and polarity values, scaled by the relative timestamps.

Through this reconstruction loss, the representation is ensured to capture the key features of object locations, motion (through polarity), and the recency of events. A representation driven by the image decoder 265 is sufficient for tasks like reactive navigation as the representation captures the essence of the environment from fast event data. Note that perfect reconstruction of the input stream is not the main goal. The decoder $q_D$ 265 is another two dense-layer network that takes the (sampled) latent vector $z_r$ 220 and outputs a reconstructed image $\hat{I}_{E_r}$. To compute the reconstruction loss, the mean squared error (MSE) between the reconstructed image and the expected event image is used. The encoder 230 is trained using the combination of the reconstruction loss and a measure of relative entropy, or how one probability distribution is different from a second, reference probability distribution. In one embodiment, a Kullback-Liebler (KL) divergence loss 260 is used.

The training is performed end-to-end, so the weights for the ECN 210 and encoder-decoder are all learned simultaneously.

During training, annealing for the KL divergence loss may be used to prevent the KL divergence loss 260 from vanishing, allowing the latent space to first encode as much global information as possible in the latent variables. While training, the encoder 235 can receive input data in two ways. The data can be passed as a set of batches with a predefined number of events per batch or can be sliced according to a predefined time window where each window has a different number of events. During inference to control the vehicle, the encoder is expected to drive control commands. The length of the time window may correspond to the control frequency of the vehicle.

As event data is an inherently temporal sequence, generating the representations is an operation that depends on timing. During inference, when the eVAE 200 is expected to compute latent vectors for streaming event data that is driven by two main factors: the control frequency $f_C$, and a feature computation frequency $f_F$. The control frequency is the frequency at which the latent vectors are required to be computed, to be subsequently used for action generation. This is the minimum frequency the network has to adhere to. The feature computation frequency $f_F$ is a value such that $f_F \geq f_C$, which drives how often the context vector (the 1×D vector after max pooling) should be computed. In case the value of $f_C$ is low, which leaves long windows of time between control commands, it might be more optimal to compute $f_F$ more frequently, thus processing less the number of events per batch and recursively update the context vector.

Due to the recursive operation, similar to EventNet, the context vector can be computed even on a per-event basis—but this is considered to be both computationally infeasible and generally not required, considering events could be generated on the order of microseconds. In one example, $f_C = f_F$ was considered for simplicity.

The event data, considered both spatially and temporally, is bounded. The upper limit for spatial data such as x and y is the resolution of the camera, polarity is a discrete +1/−1 value. The temporal data, as it is normalized within a window, is also bounded to [0, 1]. Hence, a trained event context network can be replaced by a lookup table corresponding to each pixel/polarity value, greatly improving the performance, enabling usage on constrained platforms such as UAVs.

By having the length of the time window correspond to the control frequency of the vehicle, the context vectors 230 may be computed either once at the end of the time window, or recursively at a faster rate where the context is computed and updated internally, and mapped to the latent vector when the control command is needed.

Through the use of the encoder 235, task-agnostic representations of event sequences may be learned and used for navigation/planning purposes. While a straightforward approach would be to learn perception features together with actions, this would not scale well to event bytestreams. As event cameras return data at a very high rate, relying on slow rewards, for instance, to learn features in an end-to-end manner would be a disadvantage.

Encoder pseudocode to generate the vector z 220 is provided for reference:

```
1    Encode
2    let t_s = t #record sequence start
3    let c = zeros( )
4    while t < t_S + t_C do
5    |    E = [ ]
6    |    t' = t
7    |    while t < t' + t_p do
8    |    |    e_in = (t, x, y, p)
9    |    |    e_in.t = (t - t_s)/(t_c) #normalize timestamp
10   |    |    E.append(e, n)
11   |    end
12   |    c_new = ECN(E) #compute features and temporal embedding
13   |    c = max(c, c_new)
14   end
15   z = q_e(c) #compute latent vector
16   return z
```

Decoupling perception and policy networks and using intermediate representations like vector 220 enables faster training, higher performance and generalization ability. In one embodiment, the learned compressed representation in the form of vector 220 is used in a reactive navigation framework to perform perception-action loops.

Event data may be generated by running an event camera simulator within Microsoft AirSim. AirSim acts as a plugin for Unreal Engine, a AAA videogame engine that allows for simulating realistic graphics. AirSim provides models for quadrotors and cars along with a Python based API for robot control as well as gathering data such as RGB images. Simplistic worlds may be used to collect training data and obstacle avoidance environment. For the eVAE 200 training data, Three sample environments within AirSim, named poles, cones, gates may be used in various embodiments. RGB camera data may first be collected by moving a camera in two dimensions around these objects. The RGB camera data may be subsequently converted to event bytestream data through an event simulator.

During training of the eVAE 200, batched data is provide as input to the eVAE 200. A batch size of 2000 events, with 50 batches may be used in one embodiment. The batches may be selected by sampling randomly for an index from the full the event sequence and then reading the subsequent number of events equal to the chosen batch size. An Adam optimizer with a learning rate of 0.001 may be used with training occurring during 20,000 iterations. For reconstruction loss, a mean squared error (MSE) may be used.

Annealing may be used to avoid KL vanishing problems. Annealing may be done by using a scheduling cycle to impose a changing weight on the KL loss which is also appropriately weighted according to the values of reconstruction loss.

it<1000:β=0 it>1000:β=1e−3*(it/10,000)

In some examples, a task is defined as collision avoidance for a quadrotor drone 110. In a simulation, the drone 110 is expected to navigate from a start region 105 to a goal region, destination 120 through an obstacle course, while avoiding collisions with any obstacle 115. In order to safely navigate in this way, the drone needs to be aware of the state of the environment 125 and defined by s, given which the drone 110 is expected to select an optimal action a*.

Regardless of global positions of the drone 110 or the obstacle(s) 115, the drone 110 should move in a particular direction that allows it to continue in collision-free areas and repeat this behavior until the drone 110 reaches its goal state, destination 120. Hence, navigation and obstacle avoidance constitute a sequential decision-making problem, which is addressed through reinforcement learning in one embodiment.

A conventional RL problem formulation may be used for the reactive navigation task. As the quadrotor drone 110 navigates in the environment 125 and obtains event camera 130 data, the sequences of events are output by the camera 130 through the encoder 235 with the output latent vector 220, z, to be the observation of the world state, such that $z_t = O(\cdot | s_t)$. The objective of the reinforcement learning approach is to learn a good policy $\pi_\theta(\alpha | \mathcal{Z})$.

In one embodiment, policies may be trained using a Proximal Policy Optimization (PPO) algorithm. PPO is an on-policy policy gradient method, a class of methods that generally seek to compute an estimator of the policy gradient and use a stochastic gradient ascent algorithm over the network weights. The core principle of PPO is to 'clip' the extent of policy updates in order to avoid disastrously large changes to the policy. At time t, for an advantage function A, and for a given ratio of probability under new and old policies $r_t$, PPO solves a modified objective function for the estimator that can be written as:

$$L_{PG}^{clip}(\theta) = \hat{\mathbb{E}}[\min(r_t(\theta)\hat{A}_t, \text{clip}_{1-\epsilon}^{1+\epsilon}(r_t(\theta))\hat{A}_t)]$$

Figure 3:
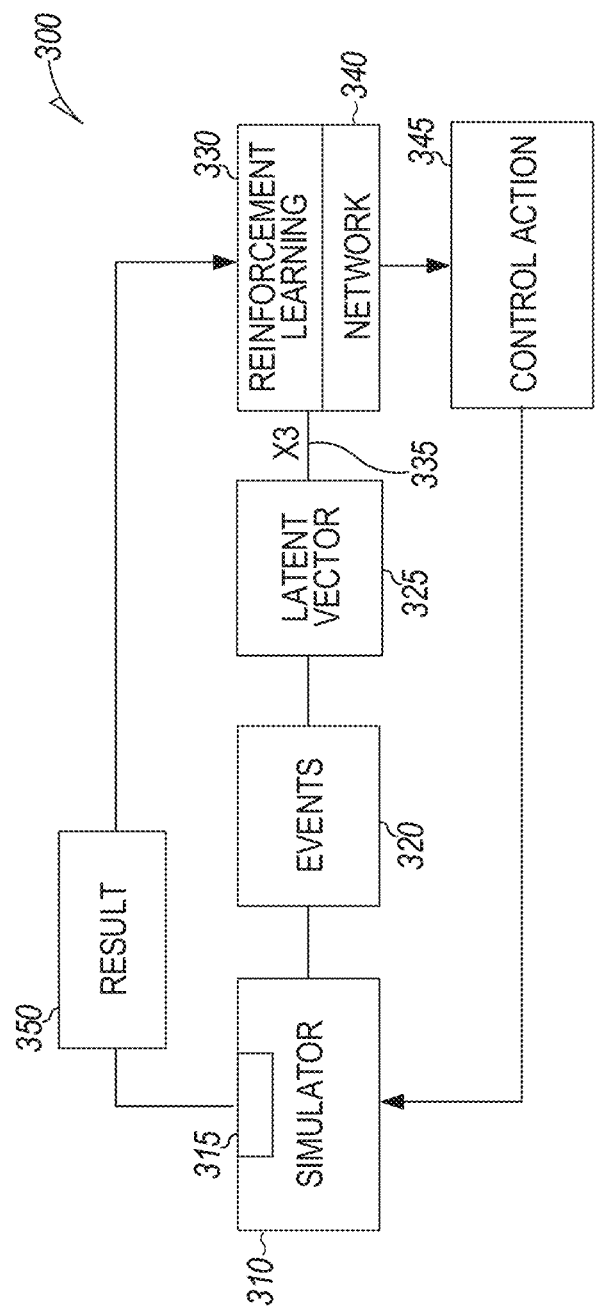
FIG. 3 is a block flow diagram illustrating a system for learning control policies for a vehicle according to an example embodiment.

FIG. 3 is a block flow diagram illustrating a system 300 for learning control policies for a vehicle. An obstacle avoidance scenario may be created within a high fidelity quadrotor simulator 310 such as AirSim, coupled with, or including, an event data simulator 315 to simulate event camera data during movement of the drone within the virtual environment. The quadrotor is assumed to be equipped with a forward-facing event camera. As the event simulator emulates events through the difference of two subsequent normal (RGB or grayscale) images, images are captured at whichever frequency corresponding to the frequency desired to control the drone. To account for this capture rate, the motion model of the drone is discretized by assuming that the drone is moving at a constant predefined velocity but the actions are of a variable step size that is dependent on the control frequency. The drone is assumed to be a simplistic point model moving at a speed of 20 m/s. Thus, for example, the step size for a 200 Hz control would be 0.1 m. For simplicity, a discrete action space with three actions 145 is used: forward, left, and right, each as long as the desired step size.

Further details about the RL training procedure and the environment 125 are now provided. A poles-train environment may be used to train the RL policies. The environment 125 is approximately 100 m in length, with randomly laid out poles as the obstacles 115, and two walls bordering it on the left and right. A lane is approximately 30 m wide. The drone 110 is spawned at one end of the lane, with an X coordinate ranging between [−10, 10], creating a 20 m wide feasible area for the start spot.

The task is to navigate successfully through the course without any collisions. Reaching 100 m+ in the Y direction counts as a success. The rewards driving the RL policy training are as follows:
- +1 for each 1 m traveled in the direction of the goal (Y-axis)
- −100 for any collision, episode terminated.
- +100 for reaching 100 m without collisions, episode terminated.

Three policies may be trained in one embodiment. Two policies (BRP-full and BRP-xy) use the bytestream representation from the eVAE 200 as the observation, whereas the third (EIP) uses an event image as observation. The third policy uses a CNN to process the event image and is trained end-to-end.

BRP-full is a policy that uses an eVAE 200 latent vector 220 as the observation; with the trained eVAE encoder 235 processing the full event data of (t, x, y, p). The latent vector is of shape 1×8, and a stack of three latent vectors is used as the observation.

BRP-xy is a policy that uses an eVAE latent vector as the observation; with the trained eVAE encoder processing only the (x, y) part of the event data. The latent vector is of shape 1×8, and a stack of three latent vectors is used as the observation, making the observation a 1×24 vector.

EIP is a policy that uses a 64×64×3 observation, with three most recent event image frames stacked together. This event image is an accumulation of all event data into a 64_64 frame with positive polarities represented as a pixel value of 255, and negative polarities as 125. The rest of the pixels stay 0. Temporal information is ignored in this event image.

For policies BRP-full and BRP-xy, a standard MipPolicy network from a stable-baselines framework may be used. This network contains two dense layers of 64 neurons each.

For policy EIP, a standard CnnPolicy network from the stable-baselines framework may be used. The structure of this network may include layers of 3@64×64, 32@8×8, 64@4×4, 64@3×3, 512, and 3. A policy may also be trained using RGB images instead of event images with this network for use in comparing training performance.

In one embodiment, an open source PPO implementation provided by Stable Baselines 3 in PyTorch may be used. A buffer size for updates may be chosen based on the step size of the drone in the environment 125, with smaller step sizes requiring a longer buffer. 2048 policy steps per update may be used for a drone step size of 0.1 m (corresponding to 200 Hz control). Training may be conducted with larger step sizes, such as 256 steps per update when using a step size of 0.5 m. Other PPO hyperparameters are as follows: learning rate=0.0003, batch size=32 (for 2048 steps), no. of epochs=10, gamma=0.99, gae lambda=0.95, clip range=0.2.

The policies (both bytestream and image) may be trained with poles as obstacles 115 in environment 125, using the trained weights from the encoder 235 also corresponding to the poles environment.

A collection of environments may be used for testing and evaluation. For more straightforward evaluation, two environments also containing poles as the main obstacles, but one containing a much denser layout, and the other a random arrangement with greater width may be used. In order to evaluate the generalization ability of the policies as seen in results, new environments with new obstacles—one with the same texture, but different shape (ellipsoid), another with the same pole shape but different textures for the walls, poles and the ground may be used.

The event camera simulator works by comparing two frames of RGB video, calculating the brightness difference for each pixel over a time threshold, and comparing the results with a calibration threshold. The algorithm below shows the steps to generate the output stream using pseudocode:

1. Take the difference between the log intensities of the current and previous frames $\Delta L(u,t) = \log(I_t) - \log(I_{t-1})$
2. Calculate the polarity for each each pixel based on a threshold of change in log intensity:

$$p(u, t) = \begin{cases} +1, & \text{if } \Delta L(u, t) > THR \\ -1, & \text{if } \Delta L(u, t) < THR \end{cases}$$

3. Determine the number of events to be fired per pixel, based on extent of intensity change over the threshold. Let Nmax be the maximum number of events that can occur at a single pixel $$N_s(u, t) = \min\left(N_{max}, \frac{\Delta L(u, t)}{THR}\right)$$

4. Determine the timestamps for each interpolated event:

$$t = t_0 + \frac{\Delta T}{N_s(u)}$$

5. Generate the output bytestream and sort by time.

In order to match the correct output of an event camera 130, in the final step the simulated events are sorted based on their temporal order. This way, all events that happened at the same time appear next to each other in the stream output, the resulting output is then written to an array for processing in encoder 235, as well as saved to a text file if requested. An example of the output stream, with each event formatted as a one-dimensional tuple vector is shown at 215 in FIG. 2A.

The event camera simulator may be implemented in Python with use of libraries such as Numba to accelerate performance. The event simulator runs alongside AirSim, and every time a new RGB image is captured from AirSim, computes the image difference and the corresponding sequence of events.

Given a timeslice of event data 320, the encoder 235 is used to encode the event data into a latent vector 325 of dimension 1×8; and for the reinforcement learning algorithm 330, a stack of the three most recent latent vectors 335 are used as the observation. As the policy network 340 is trained on top of an existing representation, it can be small. In one example, a two-layer network with 64 neurons each may be used to output the control action 345 given the stack of z vectors.

The control action 345 is provided back to the simulator 310 and applied for control of the drone being simulated. Once the action is applied, a result 350 is determined by the simulator and provided back to reinforcement learning 330 to determine the appropriate reward.

In one example, rewards used may be −100 for a collision detected by the simulator, +1 per 1 meter of progress toward the destination, +100 for reaching the destination. The simulation may be run many times, restarting with each collision or upon reaching the goal. Different starting positions and goals may be used to enhance the training. By scoring previous runs as described above, different actions may be taken, with successful actions rewarded. In some examples, upon a collision being detected, the position of the drone may be backed up and a different control action may be performed which may result in a reward.

Figure 4:
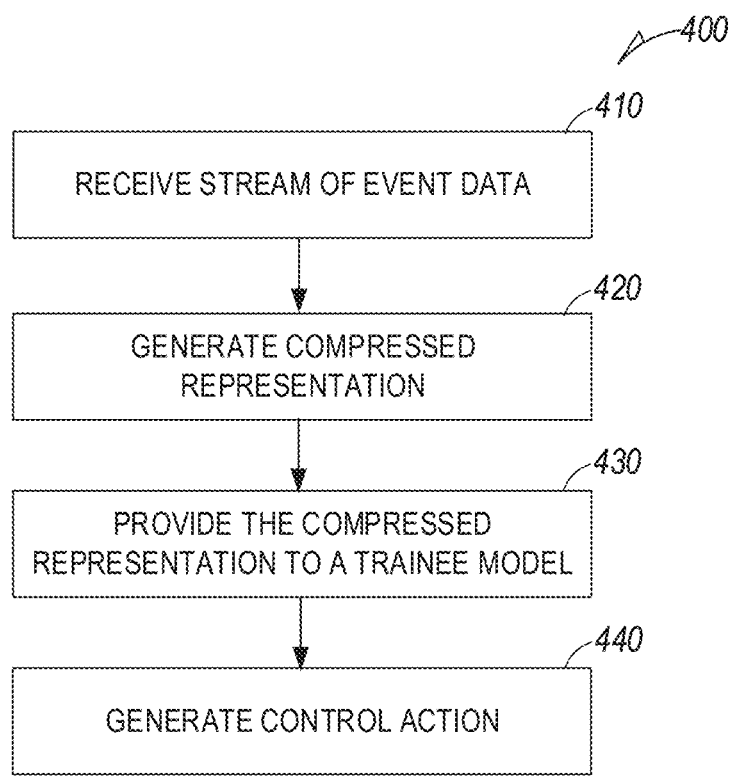
FIG. 4 is a flowchart illustrating a computer implemented method that includes operations for controlling a system moving through an environment according to an example embodiment.

FIG. 4 is a flowchart illustrating a computer implemented method 400 that includes operations for controlling a system moving through an environment. Method 400 begins at operation 410 by receiving a stream of event data from an event camera. The stream of event data includes a pixel location, a time stamp, and a polarity for each event detected by the event camera. The stream of data is provided at operation 420 to feature generators to generate a compressed representation of the stream of data. At operation 430, the compressed representation is provided to a neural network model trained on prior compressed representations using reinforcement learning to learn actions for controlling the system. A control action is generated at operation 440 via the neural network model to control the movement of the system, such as an unmanned air vehicle, to avoid obstacles within the environment.

Event data is received in one example in response to a change in logarithmic brightness of a pixel of the event camera exceeding a set threshold. The polarity for an event indicates an increase or decrease in brightness of the pixel. The event data may be received in response to detection of asynchronous events and at a non-uniform rate.

In one example, providing the stream of data to the feature generators at operation 420 includes providing the pixel location and polarity to a first spatial feature generator and providing the time stamp to a second temporal feature generator. The first spatial feature generator derives location and polarity features and the second temporal feature derives temporal features based on representation learning. The second temporal feature generator normalizes event timestamps of received event data. The location and polarity features, and the temporal features are combined via a max pool layer to generate a final context vector.

The final context vector is encoded into a compressed vector representing a latent state of the environment. Encoding the final context vector is performed by a parametric latent model learned by maximizing a marginal log-likelihood of training data, composed of a reconstruction loss and a KL-divergence loss. In one example, the compressed vector may be decoded into an event image.

Artificial intelligence (AI) is a field concerned with developing decision-making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value, or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

Figure 5:
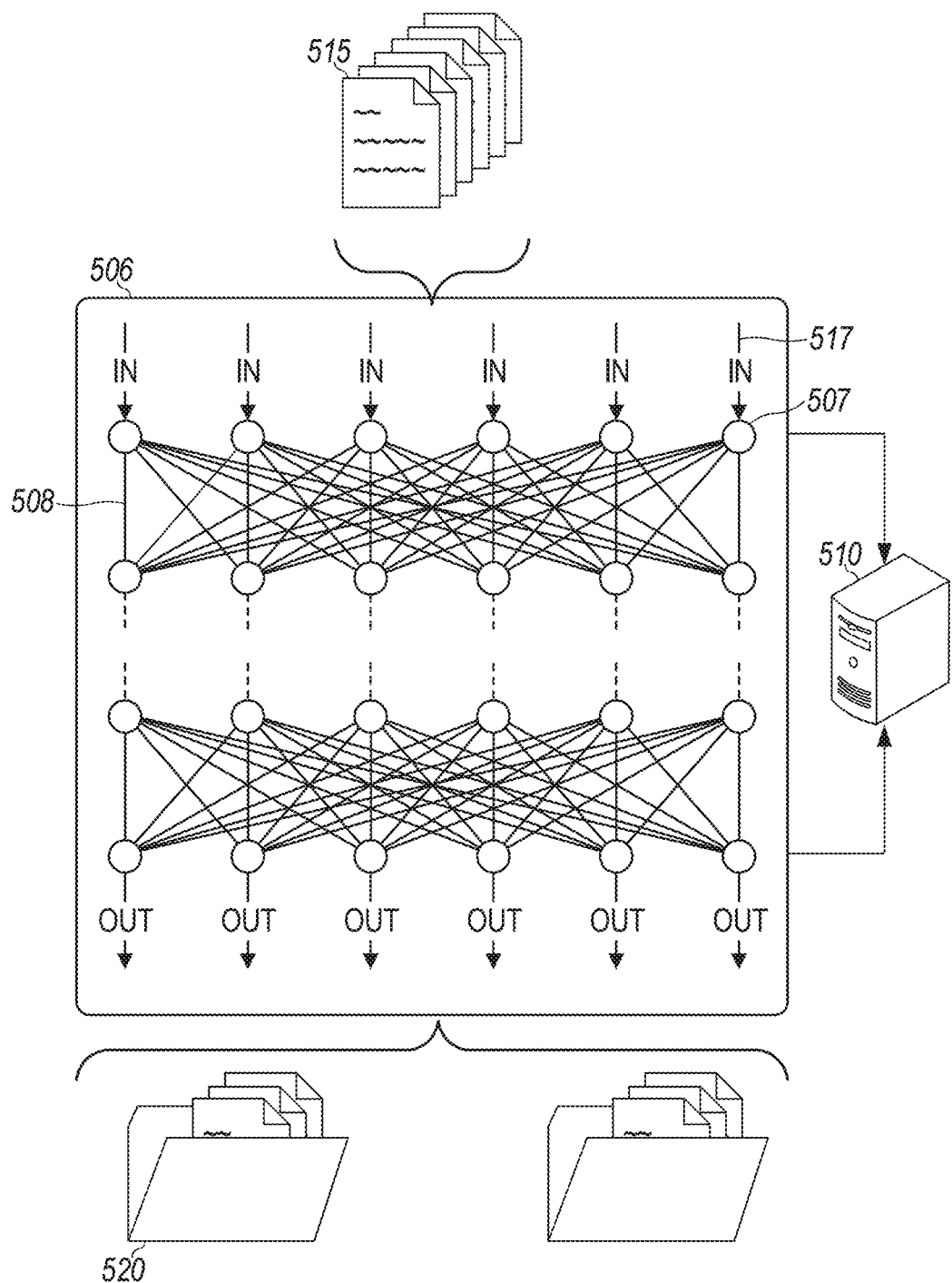
FIG. 5 is a block diagram of an example of an environment including a system for neural network training according to an example embodiment.

FIG. 5 is a block diagram of an example of an environment including a system for neural network training, according to an embodiment. The system includes an ANN 505 that is trained using a processing node 510. The processing node 510 may be a CPU, GPU, field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as red, green, and blue pixel values and intensity values for an image, pitch and volume values at discrete times for speech recognition, or event data from a camera as previously described. Each value of the training or input 517 to be classified once ANN 505 is trained, is provided to a corresponding node 507 in the first layer or input layer of ANN 505. The values propagate through the layers and are changed by the objective function, such as reinforcement learning as described above with respect to the event camera data.

As noted above, the set of processing nodes is arranged to train the neural network to create a trained neural network. Once trained, data input into the ANN will produce valid classifications 520 (e.g., the input data 517 will be assigned into categories), for example, such as vehicle controls as described herein. The training performed by the set of processing nodes 507 is iterative. In an example, each iteration of the training the neural network is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 507 (e.g., neurons) are trained independently. In an example, the nodes are trained on different hardware.

Figure 6:
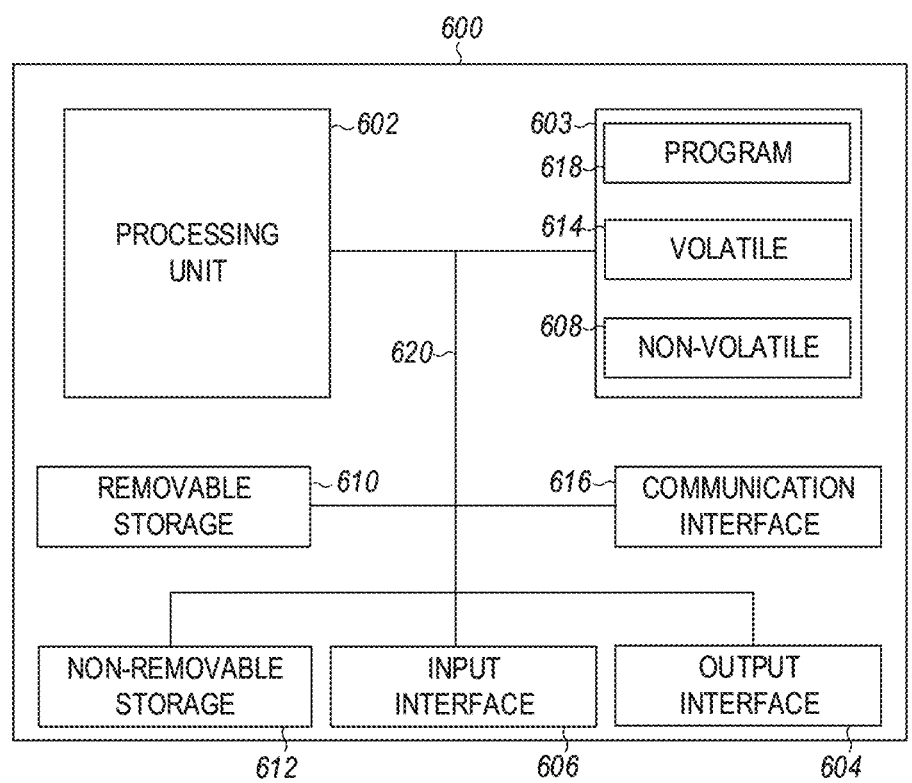
FIG. 6 is a block schematic diagram of a computer system to implement one or more example embodiments.

FIG. 6 is a block schematic diagram of a computer system 600 to perform operations to train the various encoders and models and execute or otherwise use the models to control vehicles described above as well as to perform other methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, drones, unmanned vehicles, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive. CD-ROM, and RAM are some examples of articles including a non-transitory computer-readable medium such as a storage device. The terms computer-readable medium, machine readable medium, and storage device do not include carrier waves to the extent carrier waves are deemed too transitory. Storage can also include networked storage, such as a storage area network (SAN). Computer program 618 along with the workspace manager 622 may be used to cause processing unit 602 to perform one or more methods or algorithms described herein.

Examples

1. A computer implemented method for controlling a system moving through an environment, the method including receiving a stream of event data from an event camera, the stream of event data representing a pixel location, a time stamp, and a polarity for each event detected by the event camera, generating a compressed representation of the stream of data, providing the compressed representation to a neural network model trained on prior compressed representations using reinforcement learning to learn actions for controlling the system, and generating a control action via the neural network model to control the movement of the system.
2. The method of example 1 wherein generating the compressed representation of the stream of data includes providing the pixel location and polarity to a spatial feature generator and providing the time stamp to a temporal feature generator.
3. The method of example 2 wherein the spatial feature generator derives location and polarity features and the temporal feature generator derives temporal features based on representation learning.
4. The method of example 3 and further including combining the location and polarity features and the temporal features via a max pool layer to generate a final context vector.
5. The method of example 4 and further including encoding the final context vector into the compressed representation comprising a compressed vector representing a latent state of the environment.
6. The method of example 5 wherein encoding the final context vector comprises using a probabilistic latent model learned by maximizing a marginal log-likelihood of training data, composed of a reconstruction loss and a KL-divergence loss.
7. The method of any of examples 5-6 and further including subsequently decoding the compressed vector into an event image to enable unsupervised representation learning of the location and polarity features and the temporal features.
8. The method of any of examples 2-7 wherein the temporal feature generator normalizes event timestamps of received event data.
9. The method of any of examples 1-8 wherein event data is received in response to a change in logarithmic brightness of a pixel of the event camera exceeding a set threshold.
10. The method of example 9 wherein the polarity for an event indicates an increase or decrease in brightness of the pixel.
11. The method of any of examples 1-10 wherein received stream of data comprises data from asynchronous events at a non-uniform rate.
12. A machine-readable storage device has instructions for execution by a processor of a machine to cause the processor to perform operations to perform a method for controlling a system moving through an environment, the operations including receiving a stream of event data from an event camera, the stream of event data representing a pixel location, a time stamp, and a polarity for each event detected by the event camera, generating a compressed representation of the stream of data, providing the compressed representation to a neural network model trained on prior compressed representations using reinforcement learning to learn actions for controlling the system, and generating a control action via the neural network model to control the movement of the system.
13. The device of example 12 wherein generating the compressed representation of the stream of data includes providing the pixel location and polarity to a spatial feature generator and providing the time stamp to a temporal feature generator.
14. The device of example 13 wherein the spatial feature generator derives location and polarity features and the temporal feature generator derives temporal features based on representation learning.
15. The device of example 14 wherein the location and polarity features and the temporal features are combined via a max pool layer to generate a final context vector.
16. The device of example 15 wherein the operations further comprise encoding the final context vector into the compressed representation comprising a compressed vector representing a latent state of the environment.

17. The device of example 16 wherein encoding the final context vector comprises a using a probabilistic latent model learned by maximizing a marginal log-likelihood of training data, composed of a reconstruction loss and a KL-divergence loss.
18. The device of any of examples 13-17 wherein the temporal feature generator normalizes event timestamps of received event data, wherein the event data is received in response to a change in logarithmic brightness of a pixel of the event camera exceeding a set threshold and wherein the polarity for an event indicates an increase or decrease in brightness of the pixel.
19. A device includes a processor and a memory device coupled to the processor and having a program stored thereon for execution by the processor to perform operations to perform a method for controlling a system moving through an environment. The operations include receiving a stream of event data from an event camera, the stream of event data representing a pixel location, a time stamp, and a polarity for each event detected by the event camera, generating a compressed representation of the stream of data, providing the compressed representation to a neural network model trained on prior compressed representations using reinforcement learning to learn actions for controlling the system, and generating a control action via the neural network model to control the movement of the system.
20. The device of example 19 wherein generating the compressed representation of the stream of data includes providing the pixel location and polarity to a spatial feature generator and providing the time stamp to a temporal feature generator, wherein the spatial feature generator derives location and polarity features and the temporal feature generator derives temporal features based on representation learning, wherein the location and polarity features and the temporal features are combined via a max pool layer to generate a final context vector, and wherein the operations further comprise encoding the final context vector into the compressed representation comprising a compressed vector representing a latent state of the environment.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method for controlling a system moving through an environment, the method comprising:
    receiving a stream of event data from an event camera, the stream of event data representing a pixel location, a time stamp, and a pixel polarity for each event detected by the event camera;
    generating a compressed representation of the stream of data from the event camera;
    providing the compressed representation to a neural network model trained on prior compressed representations using reinforcement learning to learn actions for controlling the system; and
    generating a control action via the neural network model to control the movement of the system.

2. The method of claim 1 wherein generating the compressed representation of the stream of data from the event camera comprises:
    providing the pixel location and polarity to a spatial feature generator; and
    providing the time stamp to a temporal feature generator.

3. The method of claim 2 wherein the spatial feature generator derives location and polarity features and the temporal feature generator derives temporal features based on representation learning.

4. The method of claim 3 and further comprising combining the location and polarity features and the temporal features via a max pool layer to generate a final context vector.

5. The method of claim 4 and further comprising encoding the final context vector into the compressed representation comprising a compressed vector representing a latent state of the environment.

6. The method of claim 5 wherein encoding the final context vector comprises using a probabilistic latent model learned by maximizing a marginal log-likelihood of training data, composed of a reconstruction loss and a KL-divergence loss.

7. The method of claim 5 and further comprising subsequently decoding the compressed vector into an event image to enable unsupervised representation learning of the location and polarity features and the temporal features.

8. The method of claim 2 wherein the temporal feature generator normalizes event timestamps of received event data.

9. The method of claim 1 wherein event data is received in response to a change in logarithmic brightness of a pixel of the event camera exceeding a set threshold.

10. The method of claim 9 wherein the polarity for an event indicates an increase or decrease in brightness of the pixel.

11. The method of claim 1 wherein received stream of data comprises data from asynchronous events at a non-uniform rate.

12. A machine-readable storage device having instructions for execution by a processor of a machine to cause the processor to perform operations to perform a method for controlling a system moving through an environment, the operations comprising:
    receiving a stream of event data from an event camera, the stream of event data representing a pixel location, a time stamp, and a pixel polarity for each event detected by the event camera;
    generating a compressed representation of the stream of data from the event camera;
    providing the compressed representation to a neural network model trained on prior compressed representations using reinforcement learning to learn actions for controlling the system; and
    generating a control action via the neural network model to control the movement of the system.

13. The device of claim 12 wherein generating the compressed representation of the stream of data from the event camera comprises:
    providing the pixel location and polarity to a spatial feature generator; and
    providing the time stamp to a temporal feature generator.

14. The device of claim 13 wherein the spatial feature generator derives location and polarity features and the temporal feature generator derives temporal features based on representation learning.

15. The device of claim 14 wherein the location and polarity features and the temporal features are combined via a max pool layer to generate a final context vector.

16. The device of claim 15 wherein the operations further comprise encoding the final context vector into the compressed representation comprising a compressed vector representing a latent state of the environment.

17. The device of claim 16 wherein encoding the final context vector comprises a using a probabilistic latent model learned by maximizing a marginal log-likelihood of training data, composed of a reconstruction loss and a KL-divergence loss.

18. The device of claim 13 wherein the temporal feature generator normalizes event timestamps of received event data, wherein the event data is received in response to a change in logarithmic brightness of a pixel of the event camera exceeding a set threshold and wherein the polarity for an event indicates an increase or decrease in brightness of the pixel.

19. A device comprising:

a processor, and a memory device coupled to the processor and having a program stored thereon for execution by the processor to perform operations to perform a method for controlling a system moving through an environment, the operations comprising:

receiving a stream of event data from an event camera, the stream of event data representing a pixel location, a time stamp, and a pixel polarity for each event detected by the event camera;

generating a compressed representation of the stream of data from the event camera;

providing the compressed representation to a neural network model trained on prior compressed representations using reinforcement learning to learn actions for controlling the system; and generating a control action via the neural network model to control the movement of the system.

20. The device of claim 19 wherein generating the compressed representation of the stream of data from the event camera comprises:

providing the pixel location and polarity to a spatial feature generator; and providing the time stamp to a temporal feature generator, wherein the spatial feature generator derives location and polarity features and the temporal feature generator derives temporal features based on representation learning, wherein the location and polarity features and the temporal features are combined via a max pool layer to generate a final context vector, and wherein the operations further comprise encoding the final context vector into the compressed representation comprising a compressed vector representing a latent state of the environment.

* * * * *